(12) United States Patent
Dierickx

(10) Patent No.: US 7,842,222 B2
(45) Date of Patent: Nov. 30, 2010

(54) PREFORM FOR BLOWING A CONTAINER AND PROCESS FOR MANUFACTURING THEREOF

(75) Inventor: William Dierickx, Destelbergen (BE)

(73) Assignee: Resilux (BE)

( * ) Notice: Subject to any disclaimer, the term of this patent is extended or adjusted under 35 U.S.C. 154(b) by 519 days.

(21) Appl. No.: 11/573,254

(22) PCT Filed: Aug. 8, 2005

(86) PCT No.: PCT/BE2005/000126

§ 371 (c)(1),
(2), (4) Date: Nov. 13, 2007

(87) PCT Pub. No.: WO2006/012713

PCT Pub. Date: Feb. 9, 2006

(65) Prior Publication Data

US 2008/0271838 A1 Nov. 6, 2008

(30) Foreign Application Priority Data

Aug. 6, 2004 (BE) .................................. 2004/0386
Sep. 3, 2004 (BE) .................................. 2004/0431

(51) Int. Cl.
*B29C 45/16* (2006.01)
(52) U.S. Cl. ................ 264/328.1; 428/36.9; 428/36.91; 264/328.8
(58) Field of Classification Search ........................ None
See application file for complete search history.

(56) References Cited

U.S. PATENT DOCUMENTS 5,804,016 A 9/1998 Schmidt et al.

(Continued)

FOREIGN PATENT DOCUMENTS

EP 0376469 A 7/1990

(Continued)

OTHER PUBLICATIONS

International Search Report mailed Dec. 30, 2005, in International Application No. PCT/BE2005/000126.

(Continued)

*Primary Examiner*—Monica A Huson
(74) *Attorney, Agent, or Firm*—Young Law Firm, P.C.

(57) ABSTRACT

Preform for the blow-molding of a container comprising a neck section (10), an adjoining wall section (20) having a substantially cylindrical shape, with in between a neck ring (12) as a transition region, and further a bottom section (30) which forms the base of the preform, which is composed of a multilayer structure consisting in two surface layers, the one of which (1) is directed outwardly respective the preform and wherein the other (3) is directed inwardly with respect thereto, with in between an intermediate layer (2) which forms a core layer, wherein both surface layers (1, 3) are composed of a primary material and wherein said intermediate layer (2) is composed of a secondary material, remarkable in that the center surface of said intermediate layer (2) is directed outwardly, toward the outer surface, with respect to the center surface of said wall section (20) and in that said primary and secondary materials respectively are mutually different. This invention further relates to a method for producing the aforementioned preform. Microorganismus are mixed into the polymers to improve material properties.

35 Claims, 7 Drawing Sheets

U.S. PATENT DOCUMENTS 6,312,641 B1 * 11/2001 Hutchinson ................. 264/513

FOREIGN PATENT DOCUMENTS

| EP | 0380215 A | 8/1990 |
| EP | 1221413 A | 7/2002 |
| JP | 10034807 A | 2/1998 |
| JP | 2002274521 A | 9/2002 |
| WO | 0134378 A | 5/2001 |

OTHER PUBLICATIONS

Written Opinion issued in International Application No. PCT/BE2005/000126, 2006.

International Preliminary Report on Patentability issued Feb. 6, 2007, in International Application No. PCT/BE2005/000126.

* cited by examiner

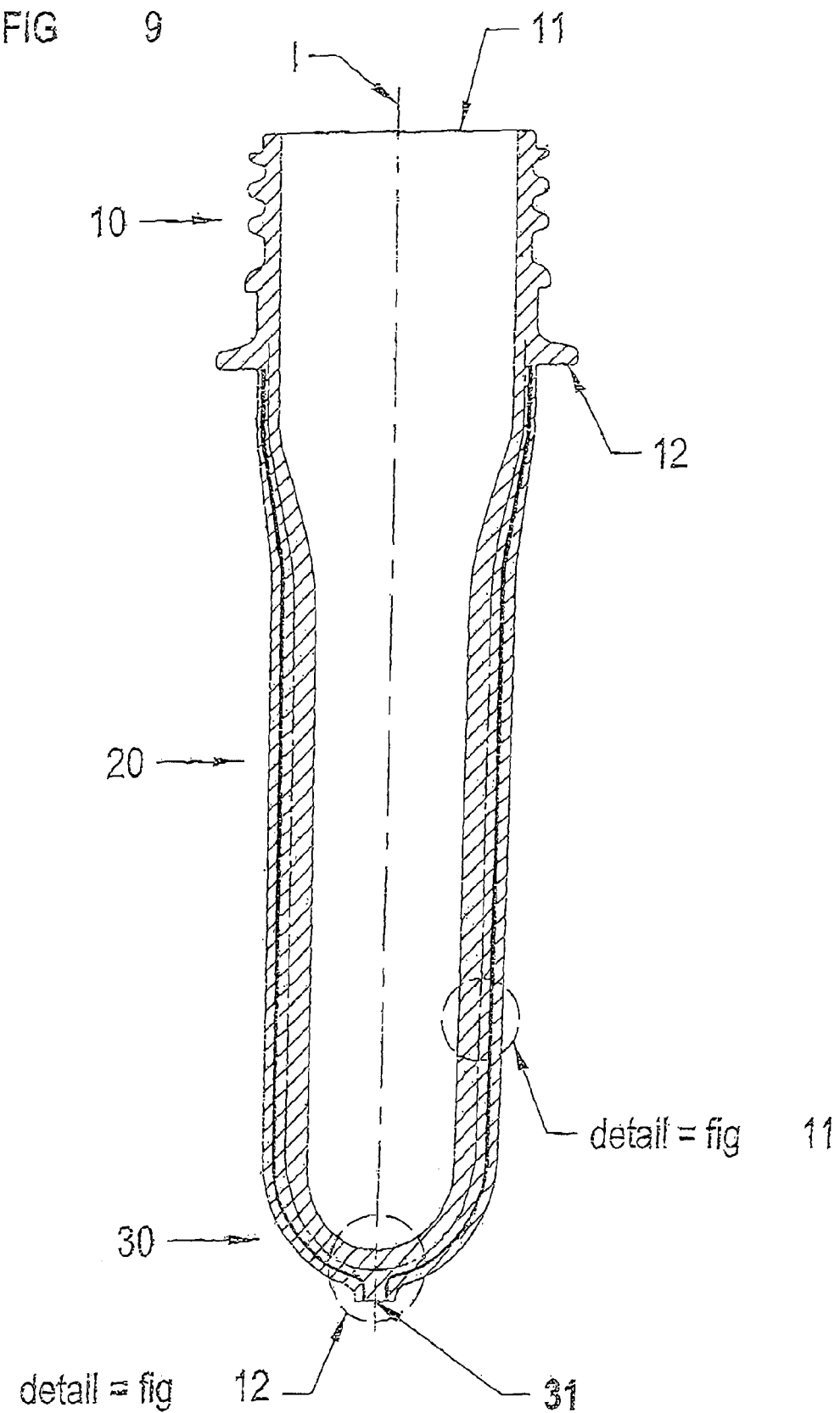

PREFORM FOR BLOWING A CONTAINER AND PROCESS FOR MANUFACTURING THEREOF

FIELD OF THE INVENTION

The present invention relates to a preform for the blow-molding of a container comprising a neck which surrounds a pouring opening, an adjoining body-forming region and, at the opposite end, a region which forms the base, the preform wall having a multilayer structure which extends along the longitudinal axis of the preform, the said preform being composed of a primary material and a secondary material, respectively, the two external layers being formed by the said primary material, and the internal layer, which forms a core layer between the two surface layers, being composed of the said secondary material.

PRIOR ART

Multilayer preforms of the abovementioned type are known. For example, there is known a preform from EP-B-0 376 469 in which the part which forms the base is built up as a five-layer structure.

Furthermore, EP 0 380 215 discloses a preform likewise comprising a core as described above, which forms a so-called barrier layer. However, this core is composed of a material which is expensive to produce, and consequently this layer needs to be as thin as possible, which in some cases constitutes an unacceptable restriction.

The aim of the abovementioned barrier layer is to counteract the migration of undesirable gas particles through the preform wall, both from the inside outward and from the outside inward.

The problem in particular is that the container is intended to contain a specific product, the intention being for this product to retain its characteristics and properties as far as possible and in the process to remain as stable as possible over the course of time.

OBJECT OF THE INVENTION

The object of the present invention is to provide a preform of the abovementioned type which optimizes the blocking action of the core layer as a barrier layer, counteracting the migration of gas particles in both directions, i.e. both from the inside outward and from the outside inward.

SUMMARY OF THE INVENTION

This object is achieved by solving the abovementioned problem by providing a preform according to the invention as defined in the main claim 1. Thanks to the particular positioning of the core or secondary layer in the preform wall, one achieves that the inner surface layer made from primary material is thicker. This offers the option of allowing a larger quantity of active constituents to come into contact with the product which is to be accommodated in the container. The main advantage that is thereby obtained is that any possible migration of undesirable constituents through the preform wall would be counteracted, in both directions, i.e. both from the outside toward the interior of the container and vice versa. This advantage is of great importance since the product stored in the container consequently retains its characteristics and properties extremely well and is therefore not subject to degradation over the course of time as a result of undesirable interactions with the outside world or even of internal origin.

According to a further embodiment of the preform according to the invention, at least the inwardly facing primary layer is composed of said primary plastics material and a predetermined quantity of additives. The presence of additives means that any constituents which migrate from outside the container toward its interior are bound and thus neutralized, so that said constituents cannot reach the product contained in the container.

Conversely, the additives in the primary layer ensure that constituents which are disadvantageous for the product stored in the container are also bound, so that these internal constituents also cannot cause degradation to the product contained in the container.

According to one specific embodiment of the preform according to the invention, said primary layer contains additives with a neutralizing action with respect to external radiation, in particular UV radiation. This offers an advantage for products such as milk which mainly degrade under the influence of light, in particular the vitamins which are present in the milk.

According to yet another embodiment of the preform according to the invention, the primary layer comprises additives with a neutralizing action on undesirable gas formation, in particular oxygen, which originates from degradation of the contents of the container and is present inside the container together with the contents, in particular in a space above the filling level of the container, where there are no contents of the beverage type, for example. This makes it possible to prevent oxidation of a beverage packaged in the container.

According to yet another embodiment of the preform according to the invention, the primary, inwardly facing layer comprises additives with a neutralizing action on disadvantageous reagents which originate from the container itself and are formed in the plastic base material, in particular PET, during production of the preform in the injection-molding machine, in particular acid aldehyde. This measure counteracts the migration of acid aldehyde constituents out of the wall of the bottle to the product contained in the bottle, making it possible to prevent changes in the taste of said product in the container.

According to a preferred embodiment of the preform according to the invention, said secondary layer is formed by a passive barrier, wherein the secondary material from which the secondary layer is produced is at least less pervious, and preferably impervious, to a substance which could migrate through it, such as oxygen, carbon dioxide or the like. The presence of a barrier layer of this type blocks the abovementioned constituents which may migrate, preventing them from migrating through the wall of the container. The blocking action of said barrier layer is bidirectional, which means that the penetration of undesirable constituents, such as oxygen for example, into the container is counteracted if the container contains products which would be oxidized or deteriorate, go off or suffer some other drop in quality under the influence of said gaseous constituents.

Conversely, said barrier layer also prevents any gaseous constituents which are desirable from starting to migrate from the product contained in the container through the wall of the container from the inside outward, for example in the case of water or beverages, such as a soft drink or beer, for example, enriched with additional oxygen or carbon dioxide.

According to a further additional embodiment of the preform, the said secondary material of the core layer has an affinity for said undesirable substances which is such that the secondary material reacts with them and will thus retain the undesirable substances in the wall of the container itself, with the result that the undesirable constituents cannot escape further or enter the interior of the container.

According to one specific embodiment of the preform according to the invention, said secondary intermediate layer is composed of a plastics material which is different from the primary layers.

According to an even more specific embodiment of the preform according to the invention, said secondary intermediate layer also comprises additives with the same function as a migration stopper for both undesirable gas constituents and radiation.

According to a particularly preferred embodiment of the preform according to the invention, the preform is composed of between 88 and 95% by weight of primary material, on the one hand, and approximately 5 to 12% by weight of secondary material, on the other hand.

The present invention also relates to a method for producing a preform as defined in the main method claim.

Furthermore, the present invention relates to a preform comprising a core or intermediate layer consisting of hydrophobic polymers incorporating living organisms and/or cell products, and a method for producing it.

Therefore, the present invention also proposes a method for producing preforms comprising an intermediate layer which includes hydrophobic polymers, in which case a hydrophobic polymer is selected, and furthermore a set of organisms are selected from among cells and/or cell products. It is remarkable that aggregates are then formed by processing said cells in said polymer, with the result that what is known as a polymer-bio aggregate is formed, producing a new function of the polymer product formed in this way.

According to a preferred embodiment of the invention, work is carried out at the working temperature range taken from the temperature interval of which the lower limit is set at virtually 100° C. under virtually standard pressure conditions, in particular at virtually one atmosphere.

According to a further preferred embodiment of the invention, the abovementioned cells are selected from the category of what are known as cysts and/or in a phase of inactive or sleeping stages. A quite significant number of types of organisms or microorganisms can change from an active life form to what is known as a quiescent stage or spore, known as cysts. Said spores are able to withstand extreme environmental fluctuations in a latent form. In this form of anabiosis, they are able to withstand extremely dry conditions and temperatures well above 100° C.

Under suitable biotechnology conditions, these types can not only be cultivated but also converted, in controlled culture conditions, known as encysting, into usable spores for bio-encapsulation in a polymeric matrix.

During the production process of an industrial product, such as packaging material or the like, said spores and the polymer are agglomerated within a short period of time during which the polymer is liquid, namely at a temperature above its melting point. This produces what is known as a polymer-bio aggregate, referred to below as "PBA".

As long as the product is not in use, the organisms of the bio-component in said PBA remain inactive. As soon as the living conditions become favorable, coinciding with the product starting to be used in association with an environment which is suitable for life in terms of temperature and relative humidity, the spores change into active, metabolizing cells under these favorable ambient conditions. For this period, the biologically active form will perform its intended function. As soon as the optimum conditions return to conditions which are less than optimum, the active form returns to the spore.

The process remains reversible in accordance with a feedback mechanism which is controlled by the living environment of the organism in said PBA.

Thus, according to a particularly preferred embodiment of the invention, said cell products are selected from the category of what are known as metabolites, i.e. the molecules which are biochemically synthesized by organisms under the abovementioned temperature working conditions.

According to yet another preferred embodiment of the present invention, the polymers are selected from non-biodegradable polymers. Reliable, slow and prolonged diffusion of organic molecules out of polymers into a moist or fluctuating environment can be realized without degradation of the polymer.

The advantages obtained by virtue of the present method are mainly that the biological activity of the organisms incorporated in the PBA produced in accordance with the invention imparts novel, previously unknown properties to the polymer. Said PBA ensures the desired environment for which said PBA was made.

A further advantage consists in the standardized release of very specific biomolecules from a polymeric matrix, such as granules and the like, without said polymeric matrix being lost in a variable environment as a result of climatological instabilities, for example.

Further details are set out in more detail below in some exemplary embodiments of the invention with reference to the appended drawings.

BRIEF DESCRIPTION OF THE DRAWINGS

FIGS. 9 to 11 illustrate a variant of the preform according to the invention corresponding to similar representations illustrated in FIGS. 1, 3 and 4, respectively.

DESCRIPTION

Figure 1:
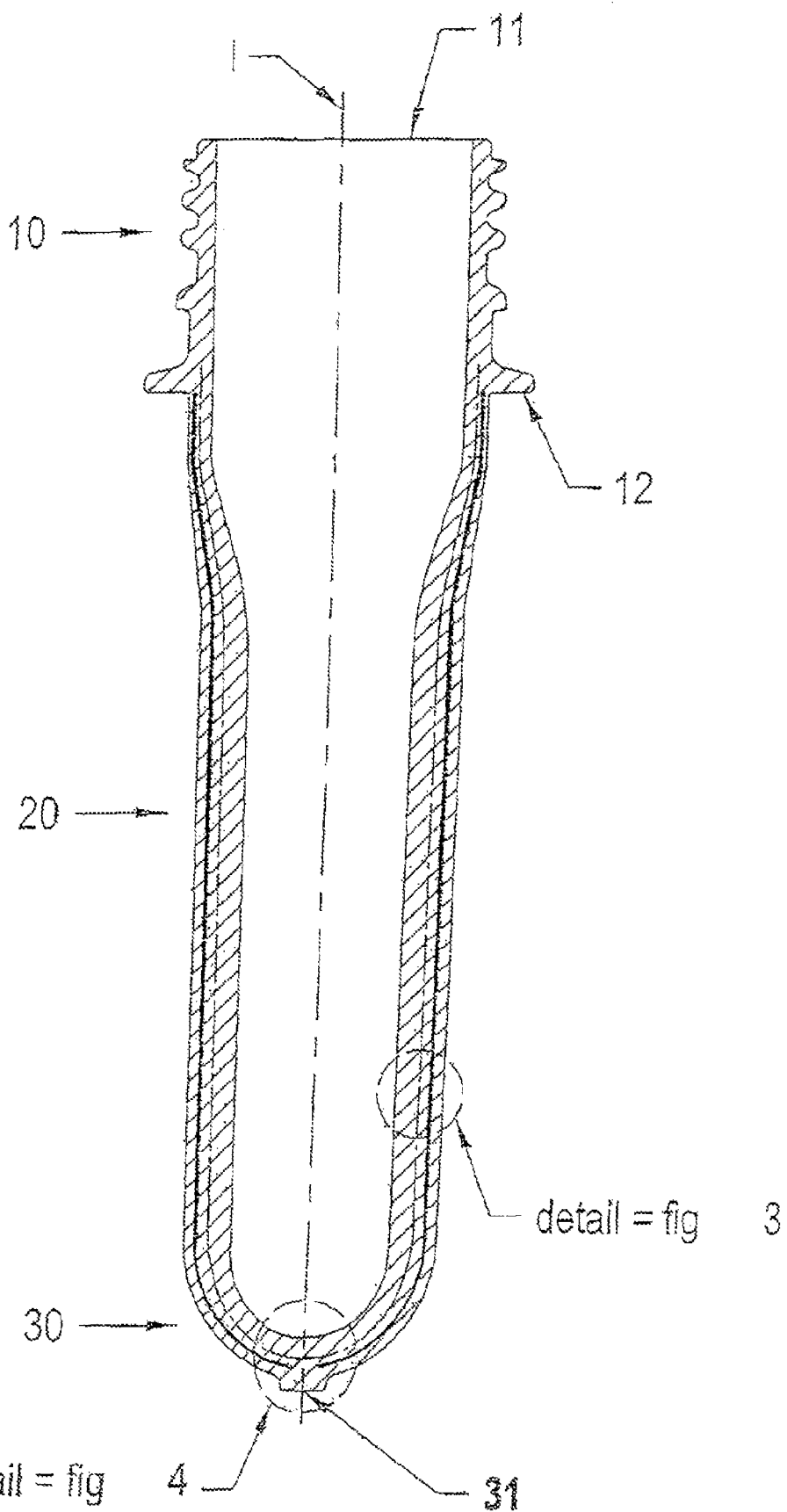
FIG. 1 is a diagrammatic representation of a cross section virtually on a center plane of a preform according to the invention.

In general terms, the present invention relates to preforms produced from plastics material which substantially comprise a neck section, which forms the pouring spout, the actual wall section, which is intended to be blown to form a container, and a bottom section which forms the base. The neck section 10 of the preform surrounds a pouring opening 11 on one side and merges into the said body section 20 of the preform in a neck ring 12. The base 30 of the preform has a sprue point 31 of the preform, along which primary and secondary material can be injected into an injection mold provided for this purpose, which is not shown. The preform extends along its longitudinal axis l.

The preform illustrated is substantially three-layered in form. This particular, specific three-layer structure is an essential feature. Therefore, the layer 1 which faces toward the outside of the preform is made from said primary material, more particularly from the same material as the layer 3 which faces toward the interior of the preform. Between the two abovementioned layers 1, 3 there is an intermediate layer 2 which forms a core layer and is made from a secondary material. In this context, it is important that the center surface of the intermediate layer 2 is toward the outside with respect to the center surface of the wall of the preform. Referring to the cross section shown in FIG. 1, the above means that the center axis of said intermediate layer 2 is offset outward, toward the outer surface of the preform, wherein the intermediate layer 2 is thus located in the half of the preform wall which is located on the outside with respect to the center axis thereof.

Figure 2:
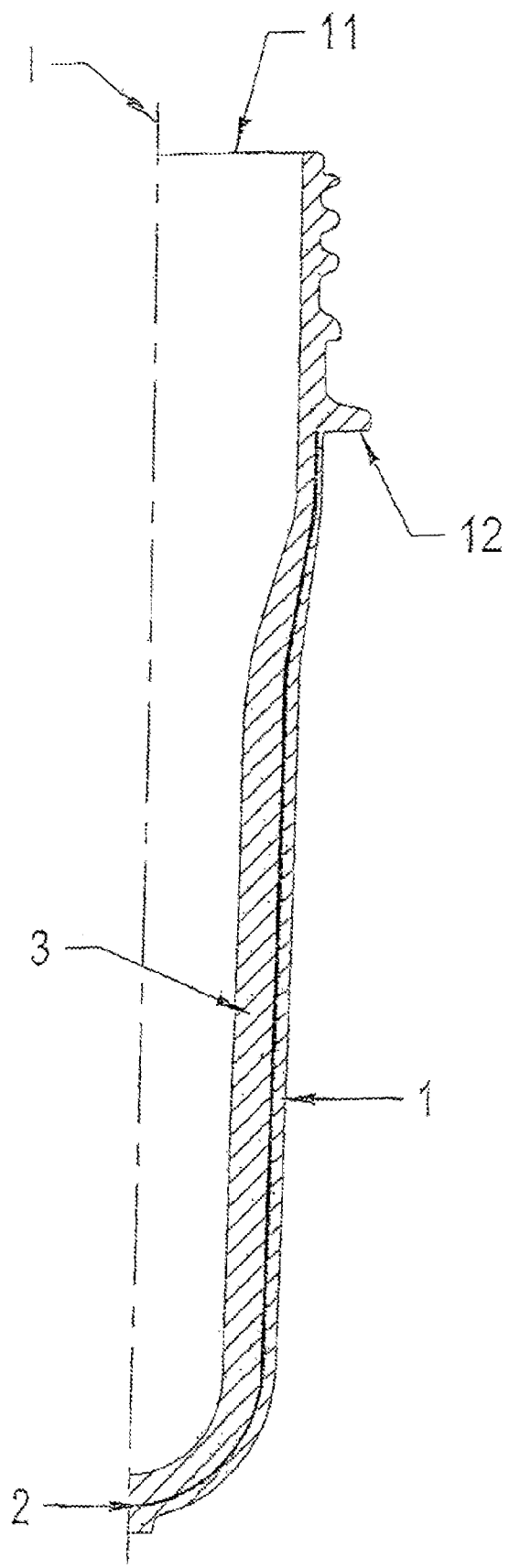
FIG. 2 is a partial view of a preform according to the invention as illustrated in FIG. 1.

This particular structure is illustrated on a larger scale in FIG. 2, from which it clearly appears that said intermediate layer 2 is directed toward the outer surface of the preform.

Figure 3:
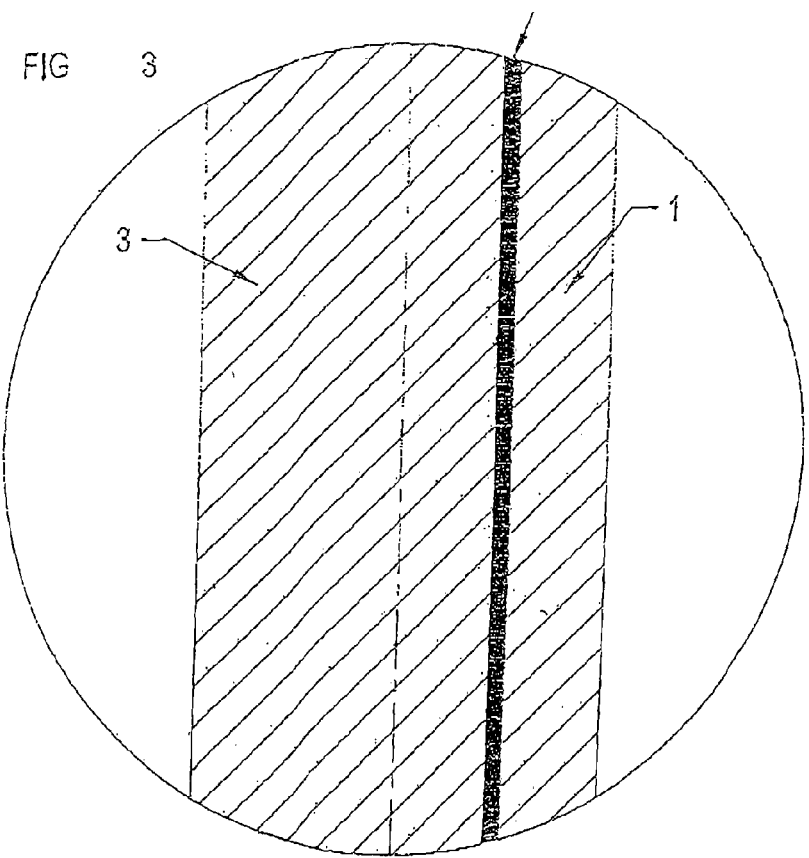
FIG. 3 is a detail view of part of the wall of the preform according to the invention illustrated in FIGS. 1 and 2.
Figure 4:
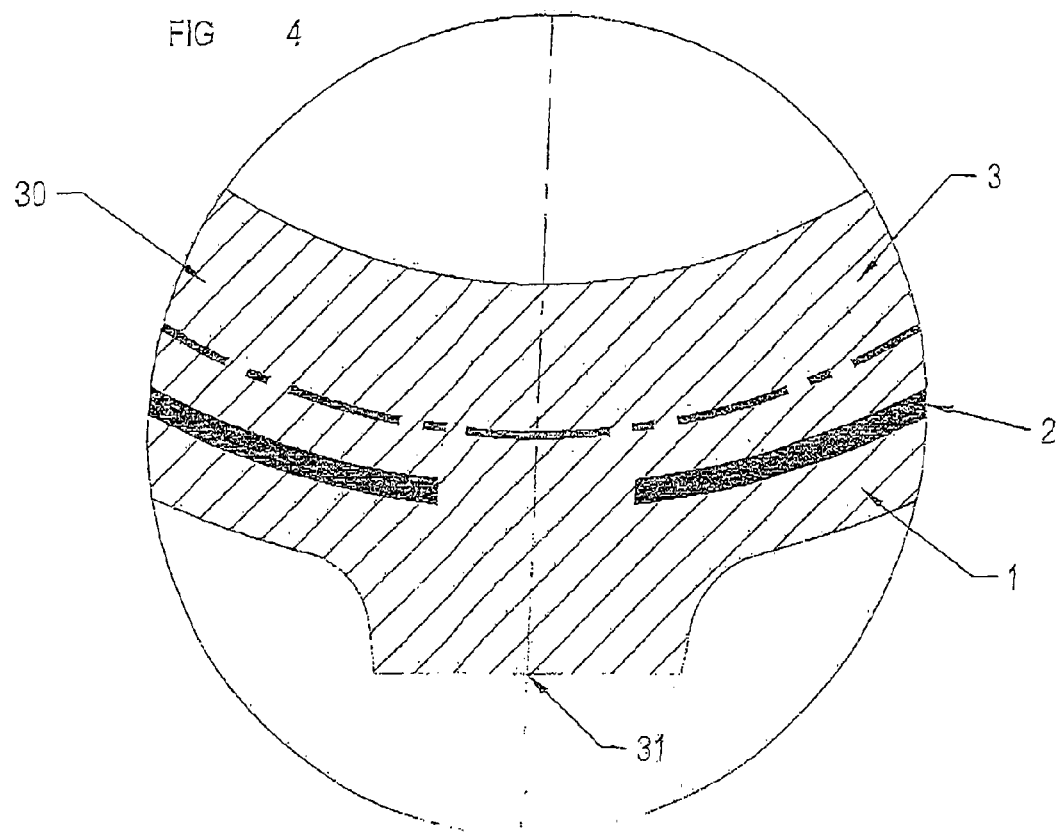
FIG. 4 is a further detail view of a further part of the preform according to the invention illustrated in FIGS. 1 and 2.
Figure 5:
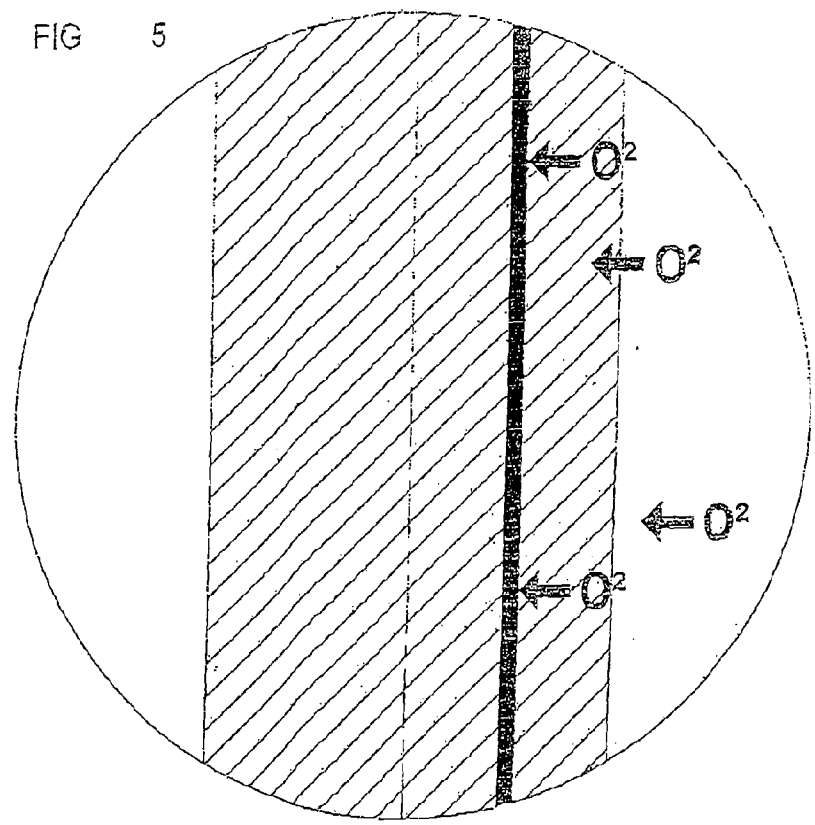
FIG. 5 diagrammatically depicts the functional operation of an essential component of the preform according to the invention.
Figure 6:
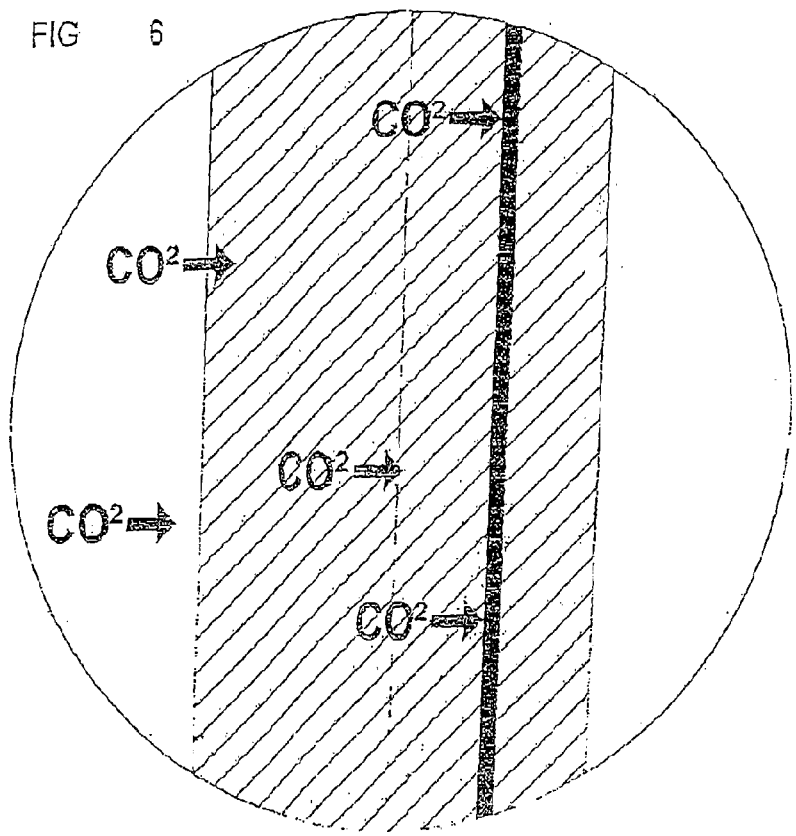
FIG. 6 shows a further diagrammatic depiction of a further functional operation of an essential component of the preform according to the invention.

A detailed illustration of a fragment of the preform wall is shown in FIG. 3. Said primary plastics material is preferably polyethylene terephthalate, or PET for short. Furthermore, the primary material may also be formed by plastics material to which additives 4 have been added, as illustrated in FIGS. 5, 6. One example of additives used in this respect is vitamins.

If appropriate, it is also possible for the primary material to be composed of a mixture of recycled plastics and additives.

More particularly, additives which bind the undesirable oxygen which starts to migrate inward from outside the bottle can be added to said primary plastics material, so that this oxygen cannot reach the product inside the bottle.

This additive can also ensure that the oxygen which is present in the bottle together with the beverage, in particular in a space above the filling level of the beverage, is bound, so that this oxygen likewise cannot cause oxidation.

It is also possible to add an additive which keeps UV rays outside the bottle, since products such as milk, and in particular the vitamins in the milk, primarily degrade under the influence of light.

Another additive is a substance which binds acid aldehyde or AA. AA is a substance which forms in PET during production of the preform in the injection-molding machine. If AA migrates out of the wall of the bottle to the product in the bottle, it can cause the flavor to change, in particular in the case of carbonated water.

Figure 7:
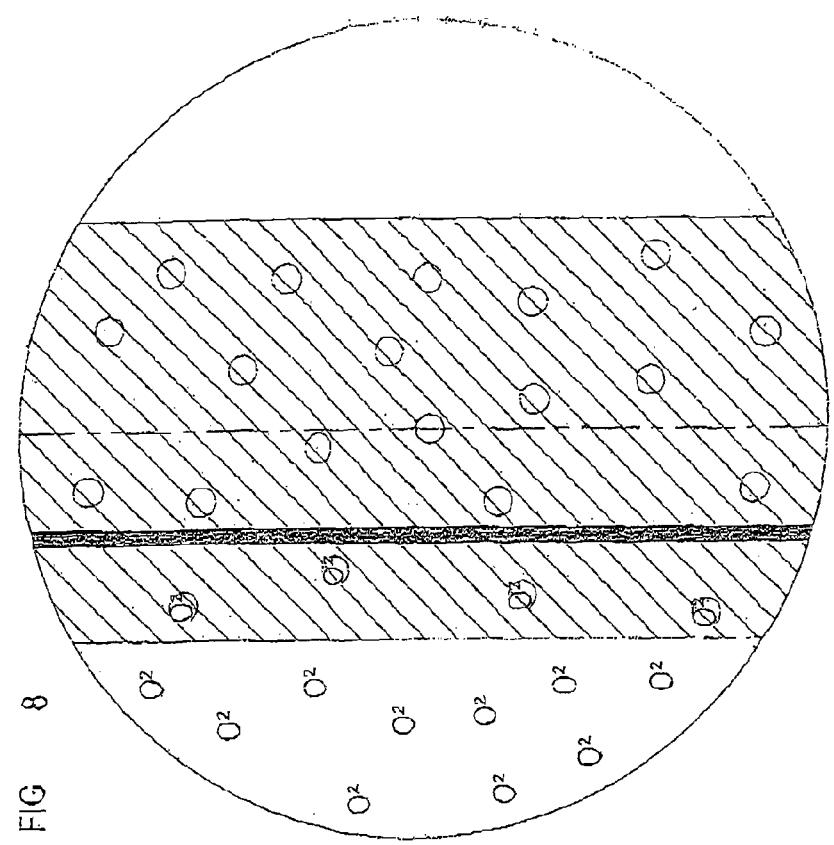
FIG. 7 shows a similar functional illustration to that shown in the previous figure of a further embodiment of the preform according to the invention.
Figure 8:
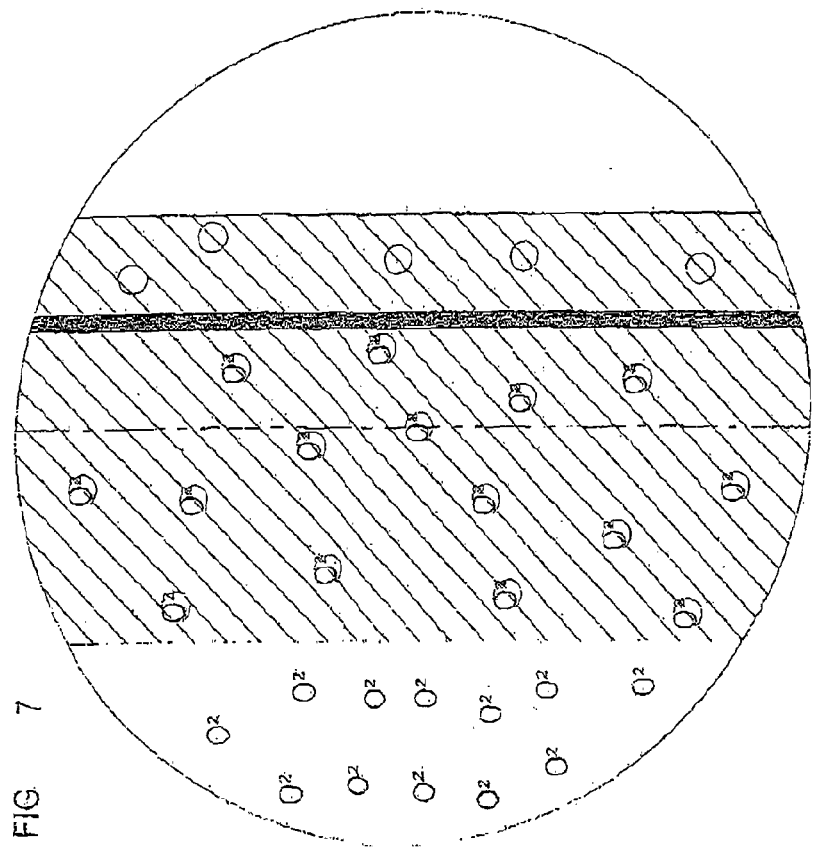
FIG. 8 shows a comparative illustration analogous to that shown in the previous figure.
Figure 11:
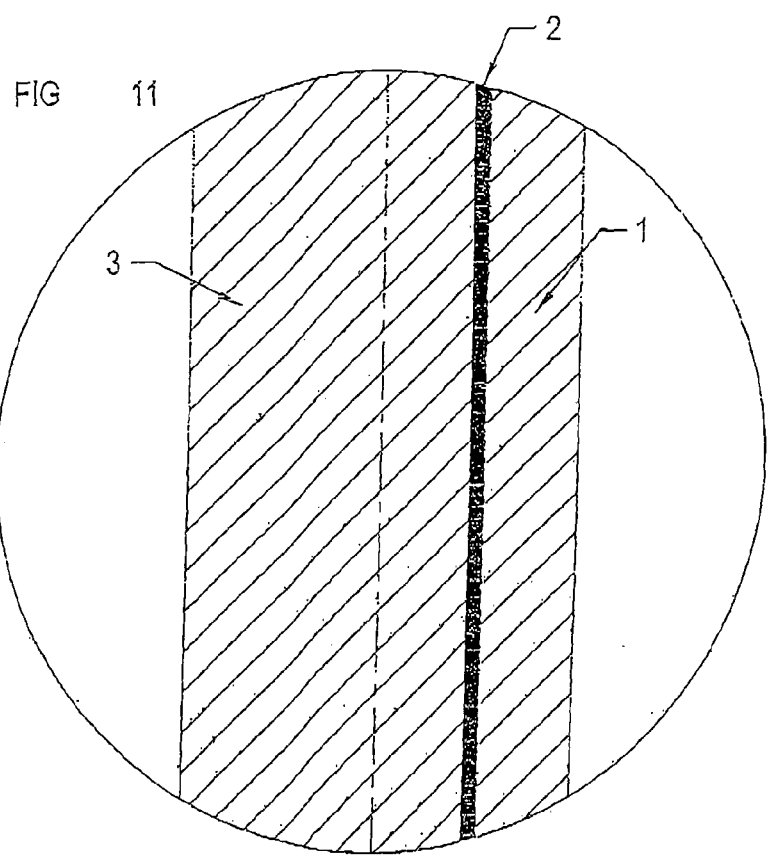

The above text demonstrates how essential the correct positioning of the secondary layer in the preform is. This is because if the secondary layer is toward the outer side of the preform, this means that the PET layer in which additives are present is thicker. If the primary PET contains additives, this permits more active constituents to be in contact with the product. In this way, for example, more oxygen from the bottle can be bound, as shown in FIGS. 7 and 8.

The secondary material in the preform, which forms the intermediate layer, is, for example, a barrier layer intended to block oxygen seeking to migrate through the wall of the bottle. The penetration of oxygen into the bottle needs to be avoided if the bottle contains products which are oxidized or broken down, go off or lose quality under the influence of oxygen, for example fruit juice or milk, as shown in FIG. 5.

This oxygen barrier layer is also important if the bottle contains water to which additional oxygen has been added. In this case, the layer prevents the oxygen from migrating through the wall from the inside outward, which would cause the water to lose quality.

A barrier layer as shown in FIG. 6 is intended to retain carbon dioxide seeking to migrate through the wall of the bottle from the inside outward. The loss of carbon dioxide from the bottle needs to be avoided if the bottle contains, for example, a soft drink or beer. That is because in this case the loss of $CO_2$ means a loss of quality in the beverage.

The barrier layer forms approx. 5 to 12% of the preform weight, depending on the use.

Furthermore, a barrier comprising PET or another plastics layer with additives added to it can perform the same function of stopping the migration of oxygen or carbon dioxide or UV rays.

Each of these barrier layers may form both an active barrier and a passive barrier, in the sense that in the case of a passive barrier the secondary material is impervious or less pervious to a specific substance, such as $O_2$, $CO_2$ and the like, and blocks this substance.

In the case of an active barrier layer, on the other hand, the secondary material will react with a specific substance and in this way retain harmful and/or undesirable substances in the wall, so that they cannot escape or penetrate any further.

Figure 10:
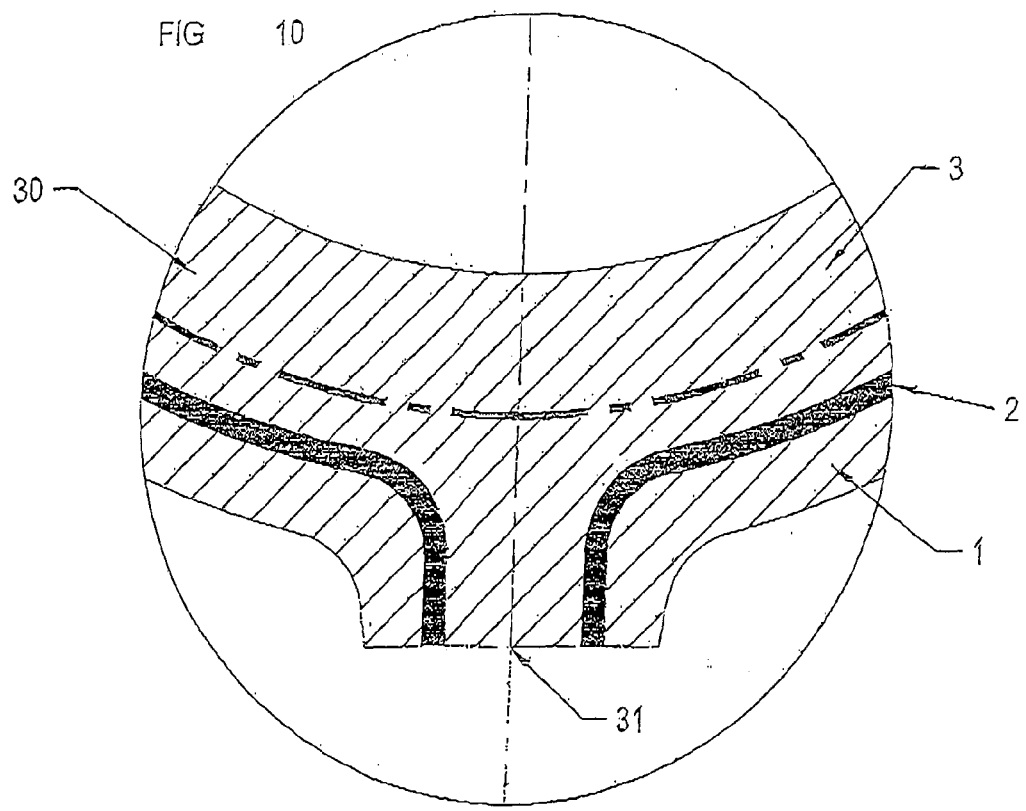

FIG. 9 shows a variant of the preform in which the preform has a bottom 30 in which said intermediate layer 2 has a bend 29 toward said bottom and extends further through the free end 31 thereof. This is illustrated in more detail in FIG. 10.

This latter embodiment is particularly recommended if said barrier layer 2 is closer to the outer side of the preform wall, as shown in FIG. 9. A non-limiting example of a composition of said barrier layer consists of EVOH, or if appropriate a different polymer.

In one specific variant embodiment of the preform, at least one barrier layer or intermediate layer thereof consists of hydrophobic polymers incorporating living organisms and/or cell products. A number of specific use examples are described below.

In the feed packaging sector which employs oxygen barriers, a PBA layer is arranged as an intermediate layer in multilayer packaging material for foodstuffs, such as PET bottles for beverages, such as beers or fruit juices for example. The polymer component of the PBA is in this case PET, while the PBA bio component is a type of yeast with a dry spore, such as for example Saccharomyces, which is able to withstand the high temperatures of the production process. The PBA remains inactive until the PET bottle has been filled. When the package is filled with fruit juices or beer, for example, the internal environment of the PBA becomes water-saturated, with the result that the spores are activated to form respiring cells which consume all the oxygen present inside the bottle. As a result, all the oxygen is withdrawn from the contents under the influence of what is known as the $O_2$ scavenger. Also, all the external oxygen which can diffuse through the wall is captured by the yeast cells for respiration, which results in an efficient oxygen barrier.

A further example of a use consists in the action as a UV blocker, which works in a similar way to the above example. Instead of yeast cells, the PBA incorporates a type of alga, such as for example *Haematococcus*, the spores of which very intensively block UV light. A continuous layer of *Haematococcus* cells, hematocysts with a high concentration of astaxanthin, makes the PBA opaque to UV light. This fact is utilized in moisture-resistant UV-proof films and polymer coverings.

A further use consists in the combined application of the two examples mentioned above in connection with food packaging with an oxygen barrier and a UV blocker which is suitable for PET bottles as packaging for beers and fruit juices and the like. The PBA bio component is a calibrated mixture of *Saccharomyces* and *Haematococcus*. Said oxygen scavengers, such as yeast cells for example, represent a permanent oxygen barrier, while the UV blocker, such as a type of alga, for example, prevents photochemical degradation of the filling.

Yet another possible application consists in the absorption of energy from sunlight with a cooling effect which is similar to the example above relating to the so-called UV blocker. Instead of *Haematococcus*, the PBA incorporates a type of alga such as for example *Chlorococcus*, the active form of which, in the presence of a high degree of moisture, participates very intensively in photosynthesis, consuming high-energy rays of the sunlight. A continuous layer of cells will provide the PBA with an energy-absorbing function, resulting in a non-heating, in other words cooling, effect at the bottom of the polymer. The above effect is utilized in moisture-resistant films and polymer coverings for sun-shielding purposes.

Possible examples relating to slow diffusion of cellular components and at least partially hydrophobic biomolecules in a moist environment are presented below.

In a variant on the UV blocker from the above example, the active metabolite, astaxanthin, which very intensively blocks UV light, is incorporated in the PBA instead of the *Haematococcus* cells. As an alternative to the expensive component astaxanthin, it may be possible to use less expensive UV blockers. The diffusion rate of the UV blocker from the PBA in the middle layer of the polylamellar film to the periphery is regulated at a low to very low diffusion rate, depending on the quality and requirements. This fact is exploited in moisture-resistant UV-repellent films and polymer coverings, as well as for packaging material for food products.

The polymer must in this case be durable and must not deteriorate in moist conditions.

The biological activity of the organisms incorporated in the PBA gives the polymer new properties which were not previously known. The PBA ensures the desired environment for which the PBA was made, such as for example an anaerobic environment, complete oxygen barrier, energy absorption of solar radiation, controlled release of metabolites and the like.

The interaction and exchange of various types of organisms or microorganisms and/or molecules in the bio component of the PBA can also yield a large number of possible applications.

The invention claimed is:

1. Preform for blow-molding a container comprising a neck section, an adjoining wall section having a substantially cylindrical shape, a neck ring between the neck section and the adjoining wall section, and a bottom section that forms a base of the preform, the preform defining a multilayer structure including a first outwardly-facing perform surface layer composed of a primary material, a second inwardly-facing perform surface layer composed of the primary material, and an intermediate core layer composed of a secondary material that is different from the first primary material, the intermediate core layer being disposed between the first and second surface layers, a center surface of the intermediate layer being directed outwardly, toward the outwardly-facing preform surface layer, with respect to a center surface of the wall section, wherein the primary material includes a synthetic PET material, the secondary material includes at least one of a recycled PET material and blends thereof with additives, and the intermediate layer includes a hydrophobic polymer and organisms selected from at least one of cells and cell products worked to aggregates in the polymer to form a polymer-bio aggregate.

2. Preform according to claim 1, wherein the primary material includes a predetermined quantity of additives.

3. Preform according to claim 2, wherein the additives are configured to have a neutralizing action on reagents that have an adverse effect on a product to be contained in the container.

4. Preform according to claim 2, wherein the additives are configured to have a neutralizing action on gas originating from degradation of a product to be contained in the container.

5. Preform according to claim 3, wherein the additives are further configured to have a neutralizing action on aldehyde acid originating from the container.

6. Preform according to claim 2, wherein the additives are further configured to have a neutralizing action on at least one of UV radiation, oxygen and carbon dioxide.

7. Preform according to claim 1, wherein the intermediate layer constitutes 5 to 12% of a weight of the preform.

8. Preform according to claim 1, wherein the base is a closed three-layered base.

9. Preform according to claim 1, wherein the intermediate layer defines a bend toward the bottom section that extends further to a free end thereof.

10. Method for producing a preform in an injection molding mould comprising the steps of:

injecting a predetermined quantity of a primary synthetic material in a hollow mould space;

injecting a predetermined quantity of a secondary material in the injected primary synthetic material in the hollow mould space before a formation of a core, the secondary material being different from the primary material, and injecting an intermediate layer including hydrophobic polymers to form the core by selecting a hydrophobic polymer, selecting a set of organisms from among at least one of cells and cell products, and forming aggregates by working the at least one of cells and cell products in the polymers to form a polymer-bio aggregate, wherein the first injecting step in the hollow mould space is a parallel injection together with a part of the primary material, and wherein when injecting in parallel in a region of a injection aperture of the hollow mould space, the secondary material is injected outwardly from the preform and the primary material is injected inwardly with respect to the preform.

11. Method according to claim 10, further comprising at least one of:

a step of adding a predetermined quantity of additives to at least one of the primary and secondary materials prior to the first and second injecting step, respectively.

12. Method according to claim 11, wherein the additives are configured to have a neutralizing action on undesired effects.

13. Method according to claim 11, wherein the adding step is carried out with the additives being configured to have a neutralizing action on undesired gas formation, which originates from degradation of liquids intended to fill a container to be produced from the preform.

14. Method according to claim 12, wherein the additives are configured to have a neutralizing action on at least one of waste and degradation materials, which originate from a container to be produced from the preform.

15. Method according to claim 12, wherein the additives are configured to have a neutralizing action on at least one of external radiation and materials.

16. Method according to claim 10 further comprising a step of producing the preform with a closed base.

17. Method according to claim 10 further comprising the step of producing the preform with a base through which the intermediate layer is bended from a free end thereof.

18. Method according to claim 10, wherein the first, second and third injection steps are carried out at a working temperature range of about 100° C. at a pressure of about one atmosphere.

19. Method according to claim 10, wherein the third injecting step is carried out with the cells being selected from among at least one of cysts cells, cells in an inactive phase and cells in a sleeping phase.

20. Method according to claim 10, wherein the third injecting step is carried out with the cells being selected from among at least one of prokaryotes, bacteria, and eukaryotes.

21. Method according to claim 10, wherein the third injecting step is carried out with the cells being eukaryotes of at least one of protists, fungi, plants, and animals type.

22. Method according to claim 10, wherein third injection step is carried out with the cells products including molecules that are biochemically synthesized by organisms.

23. Method according to claim 11, wherein the third injection step is carried out with the organisms being unicellular.

24. Method according to claim 10, wherein the third injection step is carried out with the organisms being multicellular.

25. Method according to claim 10, wherein the third injecting step is carried out with the polymers being non-biodegradable polymers.

26. Method according to claim 10, wherein the third injecting step is carried out with the polymers being polyolefins.

27. Method according to claim 10, wherein the third injecting step is carried out with the polymers being polyethylenes.

28. Method according to claim 10, wherein the third injecting step is carried out with the polymers being PET.

29. Method according to claim 10, wherein the third injecting step is carried out with the polymers being polypropylenes.

30. Method according to claim 10, wherein the third injecting step is carried out with the polymers being polyesters.

31. Method according to claim 10, wherein the third injecting step is carried out with at least one of the cells and cell products being imbedded in the polymer.

32. Method according to claim 10, wherein the biopolymer is obtained from bringing up the cells and/or cell products while producing the polymer used in the third injecting step, and wherein the biopolymer is obtained from a synthesis of basis products.

33. Method according to claim 10, wherein the third injecting step is carried out, with at least one of the cells and cell products being thermally blended into an existing polymer.

34. Method according to claim 10, wherein the third injecting step is carried out with at least one of the cells and cell products being blended in an existing polymer wherein the blending is performed cold as intermediate layer.

35. Method according to claim 10, wherein the third injecting step is carried out with at least one of the cells and cell products being blended in an existing polymer wherein the blending is performed warm as intermediate layer.

* * * * *